(12) United States Patent
Fujino et al.

(10) Patent No.: US 9,684,201 B2
(45) Date of Patent: Jun. 20, 2017

(54) LIQUID CRYSTAL DISPLAY DEVICE

(71) Applicant: Mitsubishi Electric Corporation, Tokyo (JP)

(72) Inventors: Toshiaki Fujino, Tokyo (JP); Yasunori Niwano, Tokyo (JP); Tetsuya Satake, Tokyo (JP); Takanori Okumura, Tokyo (JP); Yuji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 14/245,233

(22) Filed: Apr. 4, 2014

(65) Prior Publication Data

US 2014/0313456 A1  Oct. 23, 2014

(30) Foreign Application Priority Data

Apr. 23, 2013 (JP) .................................. 2013-089891

(51) Int. Cl.
*G02F 1/13363* (2006.01)
*G02F 1/1335* (2006.01)

(52) U.S. Cl.
CPC .... *G02F 1/133528* (2013.01); *G02F 1/13363* (2013.01); *G02F 2001/133638* (2013.01); *G02F 2201/54* (2013.01)

(58) Field of Classification Search
CPC ..... G02F 1/13363; G02F 2001/133638; G02F 1/133528; G02F 2201/54
See application file for complete search history.

(56) References Cited

U.S. PATENT DOCUMENTS

| 2005/0213003 | A1* | 9/2005 | Kaneko | G02F 1/133555 349/114 |
| 2006/0204776 | A1* | 9/2006 | Chen | B81B 3/0072 428/616 |
| 2007/0024780 | A1* | 2/2007 | Kim | G02F 1/133634 349/117 |
| 2007/0200987 | A1* | 8/2007 | Yoda | G02B 5/3016 349/119 |

(Continued)

FOREIGN PATENT DOCUMENTS

| JP | 2004-244497 A | 9/2004 |
| JP | 2006-79149 A | 3/2006 |

(Continued)

OTHER PUBLICATIONS

Office Action issued by the Japanese Patent Office on Mar. 7, 2017 in corresponding Japanese Patent Application No. 2013-089891 with english translation; 9pp.

*Primary Examiner* — Nathanael R Briggs
*Assistant Examiner* — Alexander Gross
(74) *Attorney, Agent, or Firm* — Studebaker & Brackett PC

(57) ABSTRACT

A first polarizing plate is disposed on a first main surface of a liquid crystal display panel. A second polarizing plate is disposed on a second main surface of the liquid crystal panel. The first polarizing plate includes a first polarizer and a first phase difference film laminated on a main surface on the liquid crystal display panel side in the first polarizer. The second polarizing plate includes a second polarizer and a transparent film laminated on a main surface on the side opposite to the liquid crystal display panel in the second polarizer.

14 Claims, 4 Drawing Sheets

(56) References Cited

U.S. PATENT DOCUMENTS

| | | | |
|---|---|---|---|
| 2007/0267633 A1* | 11/2007 | Park | H01L 51/524 257/59 |
| 2010/0118235 A1* | 5/2010 | Zhong | G02F 1/13363 349/98 |
| 2010/0188605 A1 | 7/2010 | Hasegawa et al. | |
| 2010/0315576 A1* | 12/2010 | Chung | G02F 1/133536 349/62 |
| 2011/0249223 A1* | 10/2011 | Suh | G02F 1/133528 349/96 |
| 2011/0255038 A1* | 10/2011 | Chang | G02B 5/3083 349/96 |
| 2013/0050617 A1 | 2/2013 | Lee et al. | |
| 2014/0232962 A1* | 8/2014 | Ishida | H01L 25/167 349/42 |

FOREIGN PATENT DOCUMENTS

| | | |
|---|---|---|
| JP | 2009-93395 A | 4/2009 |
| JP | 2009-109602 A | 5/2009 |
| JP | 2010-128293 A | 6/2010 |
| JP | 4898158 B2 | 1/2012 |
| WO | 2009/013917 A | 1/2009 |

\* cited by examiner

LIQUID CRYSTAL DISPLAY DEVICE

BACKGROUND OF THE INVENTION

Field of the Invention

The present invention relates to a liquid crystal display device.

Description of the Background Art

Liquid crystal display devices, which make the best use of characteristics such as light weight, low profile, and low power consumption, are flat display devices used most frequently for portable information devices or the like represented by personal computers. A liquid crystal display panel provided in a liquid crystal display device is manufactured, for example, in a series of processes as described below.

An alignment film made of organic polymeric materials such as a polyimide is applied onto a transparent substrate in which an interconnection and an electrode forming a pixel are formed in a matrix (also referred to as an array substrate) and onto a transparent substrate in which a color filter is formed (also referred to as a color filter substrate). Subsequently, a heat treatment and an alignment treatment are performed on the alignment film to complete the alignment film.

Next, the pair of transparent substrates including the alignment film is disposed to face each other with a spacer therebetween, and a periphery of a portion between the transparent substrates is provided with a sealing agent which adheres the transparent substrates to each other. Liquid crystals fill in the space between the pair of transparent substrates adhered to each other to complete a liquid crystal display panel.

For example, a polarizing plate is adhered to an outer side of the liquid crystal display panel manufactured as described above, and a liquid crystal display device is manufactured. In the liquid crystal display device, voltage is applied between a pixel electrode and a common electrode of the liquid crystal display panel to change an alignment direction of molecules of liquid crystals. Thus, in the liquid crystal display device, transmittance of light passing through the liquid crystals is controlled, causing an image to be displayed as a result.

In a liquid crystal display device, a polarizing plate designed for a wide viewing angle may be used to improve display characteristics. For example, Japanese Patent No. 4898158 discloses the technique capable of suppressing a color shift as seen from an oblique direction by forming a polarizing plate laminated with a polarizer and a phase difference film on one of transparent substrates of a lateral electric field type liquid crystal display panel.

As the technique disclosed in Japanese Patent No. 4898158, when the polarizing plate laminated with the polarizer and the phase difference film is used as a polarizing plate on one of transparent substrates, a warp may occur due to a change in temperatures in ambient environments. In a liquid crystal display device, when a warp occurs in a liquid crystal display panel, display characteristics may deteriorate, such as occurrence of light leakage during displaying a black. The reason that a warp occurs in the liquid crystal display panel is shown in the following.

The polarizer and the phase difference film are made of resin or the like and the transparent substrates of the liquid crystal display panel are made of a glass or the like, so that there is a difference between the thermal expansion coefficient of the polarizer and the phase difference film and the thermal expansion coefficient of the transparent substrates.

On the other hand, when only one of the polarizers on the pair of transparent substrates includes a polarizing plate having a phase difference film, the structure varies between the polarizing plates on the pair of transparent substrates. In other words, the thermal expansion behavior varies between the polarizing plates on the pair of transparent substrates. Thus, the force which acts on the transparent substrates caused by expansion and contraction of the polarizing plates varies between the pair of transparent substrates. As a result, a warp occurs in the liquid crystal display panel.

SUMMARY OF THE INVENTION

According to an aspect of the present invention, a liquid crystal display device includes a liquid crystal display panel having a first main surface and a second main surface opposite the first main surface, a first polarizing plate disposed on the first main surface, and a second polarizing plate disposed on the second main surface. The first polarizing plate includes a first polarizer, and a first phase difference film laminated on a main surface on the liquid crystal display panel side in the first polarizer. The second polarizing plate includes a second polarizer, and a transparent film laminated on a main surface on the side opposite to the liquid crystal display panel in the second polarizer.

A transparent film is laminated on a main surface on the side opposite to a liquid crystal display panel in a second polarizer, so that a difference in thermal expansion behavior between a first polarizing plate and a second polarizing plate can be reduced. Consequently, a warp of the liquid crystal display panel can be suppressed. As a result, display characteristics can improve.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
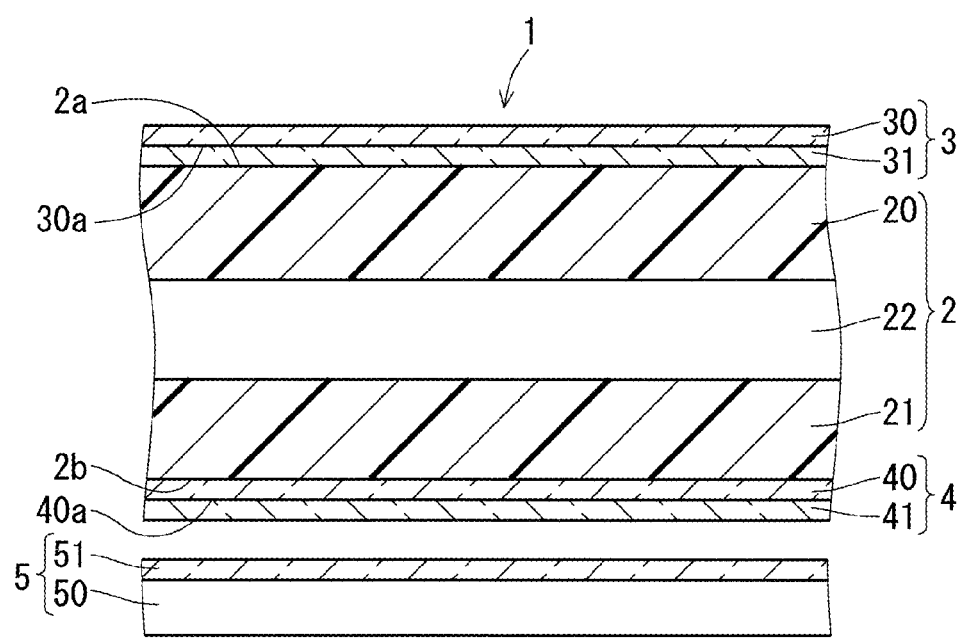
FIG. 1 is a cross sectional view showing a configuration of a liquid crystal display device according to a first preferred embodiment of the present invention.
Figure 2:
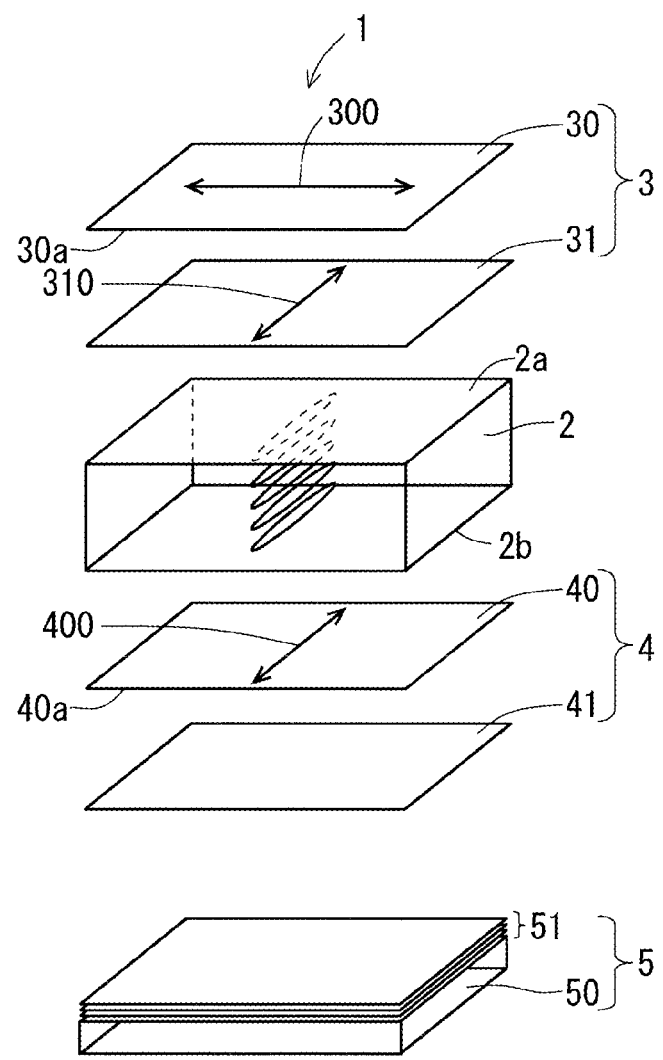
FIG. 2 is an exploded perspective view showing the configuration of the liquid crystal display device according to the first preferred embodiment of the present invention.

FIG. 1 is a cross sectional view showing a configuration of a liquid crystal display device 1 according to a first preferred embodiment of the present invention. FIG. 2 is an exploded perspective view showing the configuration of the liquid crystal display device 1 according to the preferred embodiment.

As shown in FIGS. 1 and 2, the liquid crystal display device 1 includes a liquid crystal display panel 2, a polarizing plate 3, a polarizing plate 4, and a backlight 5. The liquid crystal display panel 2 includes a transparent substrate 20 in which a color filter, a protective film, and an alignment film are formed, and a transparent substrate 21 in which an interconnection and an electrode forming a pixel are formed in a matrix and an alignment film is formed. Each of the transparent substrates 20 and 21 is, for example, a glass substrate. The transparent substrates 20 and 21 are disposed to face each other through a spacer (not shown). The transparent substrates 20 and 21 are adhered to each other with a sealing agent disposed on a periphery of a portion between the transparent substrates 20 and 21. Liquid crystals fill in the space between the transparent substrates 20 and 21. Hereinafter, the transparent substrates 20 and 21 may be referred to as a "color filter substrate 20" and an "array substrate 21," respectively.

In the preferred embodiment, an In-Plane Switching mode (lateral electric field mode), which drives liquid crystals by application of a lateral electric field, is used as an operation mode of the liquid crystal display panel 2. In the lateral electric field mode, the comb-shaped electrode formed in the array substrate 21 generates the lateral electric field to rotate molecules of the liquid crystals in a plane, to thereby control transmittance of light in the liquid crystals 22. As the operation mode of the liquid crystal display panel 2, operation modes other than the lateral electric field mode may be used. For example, as the operation mode of the liquid crystal display panel 2, the liquid crystals are driven by application of an electric field including the lateral electric field, so that a fringe field switching (FFS) mode included in the lateral electric field in a broad sense or other modes, such as a vertical alignment (VA) mode and a twisted nematic (TN) mode, may be used.

The polarizing plate 3 is disposed on a first main surface 2*a* on the color filter substrate 20 side in the liquid crystal display panel 2. More specifically, the polarizing plate 3 is adhered to the first main surface 2*a*, namely, the main surface on the opposite side to the liquid crystals 22 in the color filter substrate 20. The polarizing plate 3 includes a polarizer 30 and a phase difference film 31. The phase difference film 31 is laminated on a main surface 30*a* on the liquid crystal display panel 2 side in the polarizer 30. The phase difference film 31 is interposed between the polarizer 30 and the color filter substrate 20. An absorption axis 300 of the polarizer 30 and a slow axis 310 of the phase difference film 31 are vertical to each other. The phase difference film 31 changes a polarization state of light that has passed through the liquid crystal display panel 2.

Thus, the phase difference film 31 is disposed between the polarizer 30 and the liquid crystal display panel 2 to improve display characteristics of the liquid crystal display device 1. Hereinafter, the polarizing plate 3 may be referred to as a "color filter-side polarizing plate 3."

The polarizing plate 4 is disposed on a second main surface 2*b* on the array substrate 21 side in the liquid crystal display panel 2. More specifically, the polarizing plate 4 is adhered to the second main surface 2*b*, namely, the main surface on the side opposite to the liquid crystals 22 in the array substrate 21. The polarizing plate 4 includes a polarizer 40 and a transparent film 41. The polarizer 40 is laminated on the second main surface 2*b* of the liquid crystal display panel 2. The transparent film 41 is laminated on a main surface 40*a* on the side opposite to the liquid crystal display panel 2. Thus, the polarizer 40 is interposed between the array substrate 21 and the transparent film 41. An absorption axis 400 of the polarizer 40 and the slow axis 310 of the phase difference film 31 are parallel to each other. The absorption axis 400 of the polarizer 40 and the absorption axis 300 of the polarizer 30 are vertical to each other. Hereinafter, the polarizing plate 4 may be referred to as an "array-side polarizing plate 4."

The polarizer 30, the polarizer 40, and the phase difference film 31 are each made of resin (synthetic resin), for example. The polarizer 30 and the polarizer 40 each have, for example, a three-layer structure in which protective layers are laminated, through adhesive layers, on both sides of a polarizing film having a polarizing function. The polarizing film and the protective layers are each formed of, for example, a polymer film. The polarizing film is formed of, for example, a polyvinyl alcohol (PVA) absorbing dichroic material, such as iodine complex. The polymer film forming the protective layers is preferably excellent in terms of transparency, mechanical strength, heat stability, water-blocking properties, isotropy, and the like. As the polymer film forming the protective layers, a triacetyl cellulose (TAC) layer may be used. The polarizer 30 and the polarizer 40 have the same thickness and are formed of the same materials, for example. The phase difference film 31 is formed of, for example, the polymer film similarly to the polarizing film.

The backlight 5 includes a light source which is not shown, a light guide plate 50, and an optical sheet group 51 disposed on the light guide plate 50. The backlight 5 is disposed to face the array-side polarizing plate 4. The optical sheet group 51 is formed of a plurality of optical sheets and disposed to face the array-side polarizing plate 4. The optical sheet group 51 includes a diffusion sheet and a lens sheet. In the preferred embodiment, the backlight 5 is not provided with a polarization reflection film for enhancing brightness. Thus, the light outputted from the backlight 5 to the array-side polarizing plate 4 is a non-polarized light (natural light).

In the backlight 5, the light outputted from the light source, which is a fluorescent tube, a light-emitting diode, or the like, is diffused in the light guide plate 50 and subsequently outputted to the array-side polarizing plate 4 through the optical sheet group 51. The light outputted from the backlight 5 is inputted to the liquid crystal display panel 2 through the array-side polarizing plate 4. The light that has passed through the liquid crystal display panel 2 passes through the color filter-side polarizing plate 3 and reaches eyes of a user of the liquid crystal display device 1. This enables the user to visually identify an image displayed on the liquid crystal display device 1.

In the liquid crystal display device 1 having the structure as described above, in a case where there is a difference in thermal expansion behavior between the color filter-side polarizing plate 3 and the array-side polarizing plate 4, the force which acts on the color filter substrate 20 (first main surface 2*a* of the liquid crystal display panel 2) caused by the thermal expansion of the color filter-side polarizing plate 3 and the force which acts on the array substrate 21 (second main surface 2*b* of the liquid crystal display panel 2) caused by the thermal expansion of the array-side polarizing plate 4 vary from each other. As a result, a warp occurs in the liquid crystal display panel 2, whereby display characteristics of the liquid crystal display device 1 may deteriorate.

In the preferred embodiment, the array-side polarizing plate 4 is provided with the transparent film 41 such that the thermal expansion behavior of the array-side polarizing plate 4 approaches the thermal expansion behavior of the color filter-side polarizing plate 3 having the phase difference film 31. In other words, the array-side polarizing plate 4 is provided with the transparent film 41, and thus a difference in rigidity between the array-side polarizing plate 4 and the color filter-side polarizing plate 3 is reduced, to thereby reduce a difference in the thermal expansion behavior between the array-side polarizing plate 4 and the color filter-side polarizing plate 3.

An optically isotropic film or a phase difference film may be used as the transparent film 41. The transparent film 41 is preferably a film having the same positive and negative thermal expansion coefficient as that of the phase difference film 31. The thermal expansion coefficient of the transparent film 41 is preferably the same or approximately the same as that of the phase difference film 31 in an operating temperature range of the liquid crystal display device 1 (for example, in an approximate range from −40 to +90° C.). The transparent film 41 preferably has the same or approximately the same thickness as that of the phase difference film 31. Thus, the polarizing plate 3 has approximately the same rigidity as that of the polarizing plate 4. In addition, the transparent film 41 is preferably formed of the same material as that of the phase difference film 31 regardless of whether the transparent film 41 is an optically isotropic film or a phase difference film.

In a case where a phase difference film is used as the transparent film 41, the same type of phase difference film as the phase difference film 31 is preferably used as the transparent film 41. Moreover, a phase difference film, which is the same type as the phase difference film 31 and has the same thickness as that of the phase difference film 31, is preferably used as the transparent film 41. The slow axis of the phase difference film used as the transparent film 41 and the slow axis of the phase difference film 31 of the polarizing plate 3 are preferably parallel to each other. In a case where the phase difference film of the polarizing plate 4 and the phase difference film 31 of the polarizing plate 3 are the same type and have the same thickness and the slow axes in the same direction, they exhibit approximately the same thermal expansion behavior. Thus, the difference in the thermal expansion behavior between the polarizing plate 3 and the polarizing plate 4 is reduced, whereby occurrence of a warp in the liquid crystal display panel 2 can be suppressed.

In a case where a phase difference film is used as the transparent film 41, the phase difference film, in contrast to the phase difference film 31 of the polarizing plate 3, is disposed outside the polarizer 40 instead of being disposed between the liquid crystal display panel 2 and the polarizer 40. The phase difference film changes a polarization state of an input light in a case where the input light is a polarized light, and the phase difference film does not change a polarization state of an input light in a case where the input light is a non-polarized light. In the preferred embodiment, the light outputted from the backlight 5 is the non-polarized light, so that the non-polarized light is inputted to the phase difference film serving as the transparent film 41. Therefore, in the preferred embodiment, if a phase difference film is used as the transparent film 41, the phase difference film has a characteristic that does not change a polarization state of the light passing through the liquid crystal display panel 2 regardless of the direction of the slow axis (or fast axis) of the phase difference film. Consequently, the phase difference film may be a uniaxial phase difference film or a biaxial phase difference film.

As described above, in the preferred embodiment, the transparent film 41 is laminated on the main surface 40a on the side opposite to the liquid crystal display panel 2 in the array-side polarizer 40, so that the difference in the thermal expansion behavior between the color filter-side polarizing plate 3 and the array-side polarizing plate 4 can be reduced. Consequently, a warp of the liquid crystal display panel 2 can be suppressed. As a result, display characteristics of the liquid crystal display device 1 improve.

Moreover, the thickness of the transparent film 41 is made identical to the thickness of the phase difference film 31, and thus the difference in the thermal expansion behavior between the color filter-side polarizing plate 3 and the array-side polarizing plate 4 can be further reduced. Consequently, the warp of the liquid crystal display panel 2 can be further suppressed.

The transparent film 41 is formed of the same material as that of the phase difference film 31, and thus the difference in the thermal expansion behavior between the color filter-side polarizing plate 3 and the array-side polarizing plate 4 can be further reduced. Consequently, the warp of the liquid crystal display panel 2 can be further suppressed.

The same type of phase difference film as the phase difference film 31 is used as the transparent film 41, and thus the difference in the thermal expansion behavior between the color filter-side polarizing plate 3 and the array-side polarizing plate 4 can be further reduced. Consequently, the warp of the liquid crystal display panel 2 can be further suppressed.

In a case where a phase difference film is used as the transparent film 41, the slow axis of the phase difference film is parallel to the slow axis of the phase difference film 31, and thus the difference in the thermal expansion behavior between the color filter-side polarizing plate 3 and the array-side polarizing plate 4 can be further reduced. Consequently, the warp of the liquid crystal display panel 2 can be further suppressed.

In contrast to the preferred embodiment, in a case where the transparent film 41 is disposed between the array-side polarizer 40 and the liquid crystal display panel 2, the difference in the thermal expansion behavior between the array-side polarizing plate 4 and the color filter-side polarizing plate 3 can be reduced.

However, in this case, when the transparent film 41 is a phase difference film, a polarized light outputted from the array-side polarizer 40 is inputted to the phase difference film, and thus the polarization state of the light incident on the liquid crystal display panel 2 may be changed. As a result, display characteristics of the liquid crystal display device 1 may deteriorate. In this case, the slow axis of the phase difference film serving as the transparent film 41 is made parallel or vertical to the absorption axis 400 of the array-side polarizer 40, and thus a change in the polarization state of the light incident on the liquid crystal display panel 2 can be suppressed. However, during manufacturing the liquid crystal display device 1, variations occur in the angle at which the phase difference film and the polarizer are bonded, so that it is difficult to accurately make the slow axis of the phase difference film serving as the transparent film 41 and the absorption axis 400 of the array-side polarizer 40 parallel or vertical to each other. Thus, the liquid crystal display device 1 in which desirable display characteristics cannot be obtained may be manufactured. As a result, manufacturing yield is reduced.

In the preferred embodiment, the transparent film 41 is laminated on the main surface 40a on the side opposite to the liquid crystal display panel 2 in the array-side polarizer 40, so that occurrence of the problems as mentioned above can be suppressed. Therefore, manufacturing yield can be improved.

Second Preferred Embodiment

Figure 3:
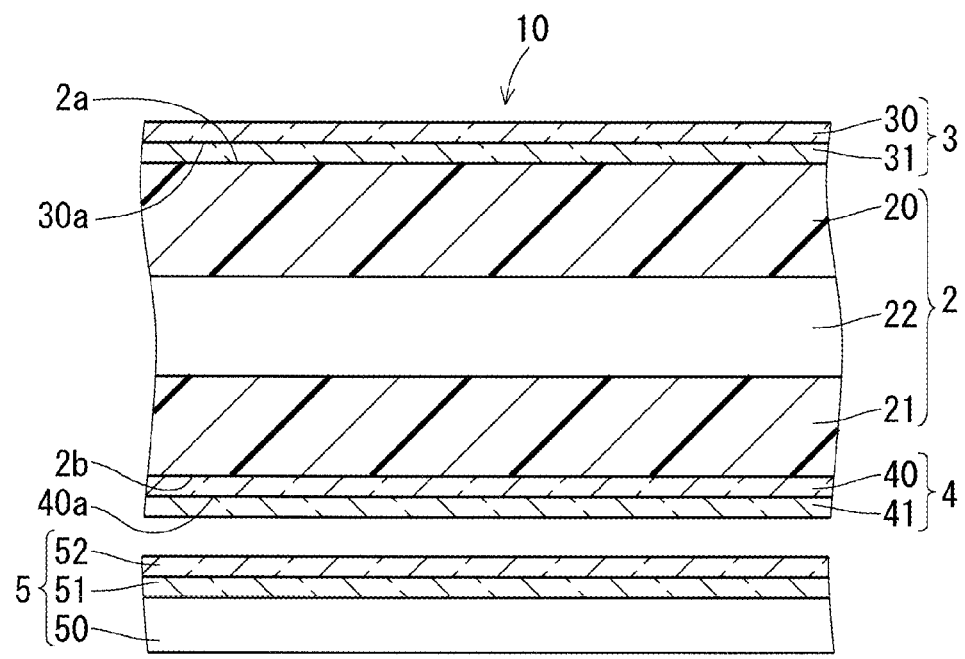
FIG. 3 is a cross sectional view showing a configuration of a liquid crystal display device according to a second preferred embodiment of the present invention.
Figure 4:
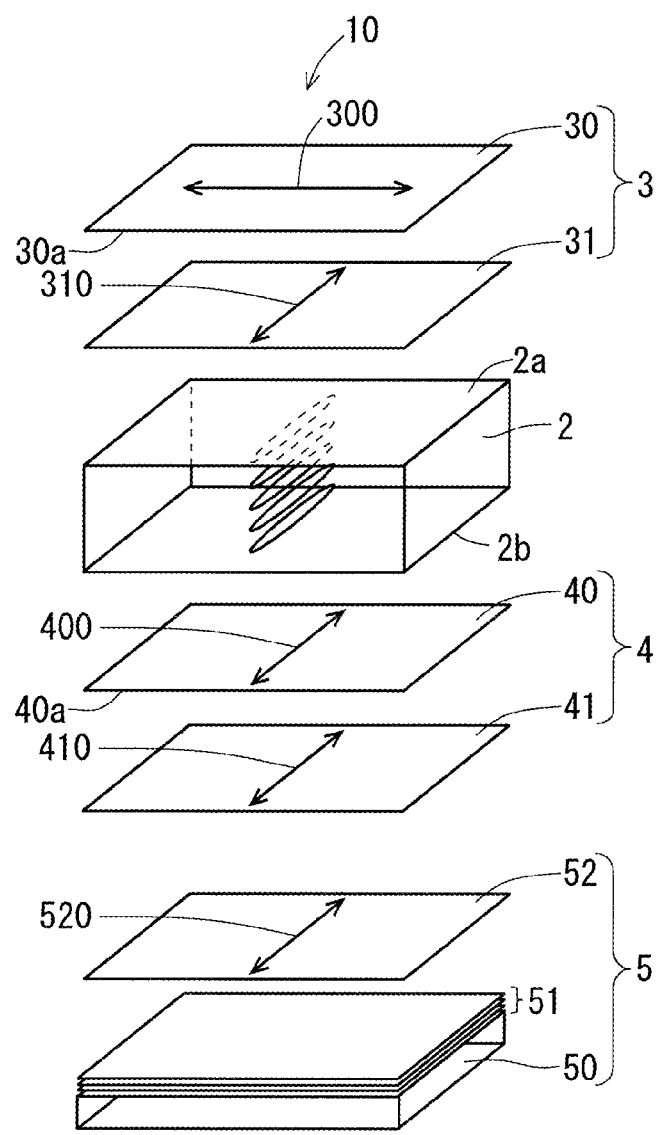
FIG. 4 is an exploded perspective view showing the configuration of the liquid crystal display device according to the second preferred embodiment of the present invention.

FIG. 3 is a cross sectional view showing a configuration of a liquid crystal display device 10 according to a second preferred embodiment of the present invention. FIG. 4 is an exploded perspective view showing the configuration of the liquid crystal display device 10 according to the preferred embodiment. Hereinafter, the liquid crystal display device 10 according to the preferred embodiment will be described by focusing on differences from the liquid crystal display device 1 according to the first preferred embodiment as described above.

In the liquid crystal display device 10 according to the preferred embodiment, a backlight 5 is provided with a polarization reflection film (also referred to as a reflective polarizing film) 52 for enhancing brightness. The polarization reflection film 52 is disposed on an optical sheet group 51 so as to face a transparent film 41 of an array-side polarizing plate 4. For example, a dual brightness enhancement film (DBEF) manufactured by 3M is adopted as the polarization reflection film 52.

In the backlight 5, a light outputted from a light source is diffused in a light guide plate 50 and subsequently outputted to the array-side polarizing plate 4 through the optical sheet group 51 and the polarization reflection film 52 in the stated order. In the light that has passed through the polarization reflection film 52, a polarized light component orthogonal to a reflection axis 520 of the polarization reflection film 52 increases. In other words, the light that has passed through the polarization reflection film 52 is in a weak linear polarized state.

In the preferred embodiment, a phase difference film is used as the transparent film 41. Hereinafter, the transparent film 41 according to the preferred embodiment may be referred to as a "phase difference film 41." In the preferred embodiment, a slow axis 410 of the phase difference film 41, an absorption axis 400 of an array-side polarizer 40, and the reflection axis 520 of the polarization reflection film 52 are parallel to one another.

As described above, the light that has passed through the polarization reflection film 52 is in the weak linear polarized state, so that a polarized light is inputted to the phase difference film 41 of the array-side polarizing plate 4. Therefore, a polarization state of light in the phase difference film 41 may be changed according to the direction of the slow axis 410 (optical axis) of the phase difference film 41. As a result, the light inputted to the array-side polarizer 40 is absorbed into the array-side polarizer 40, and thus light usage efficiency may be reduced.

In the preferred embodiment, the slow axis 410 of the phase difference film 41, the absorption axis 400 of the array-side polarizer 40, and the reflection axis 520 of the polarization reflection film 52 are parallel to one another. Thus, the light that has passed through the polarization reflection film 52 reaches the array-side polarizer 40, whose polarization state remains unchanged in the phase difference film 41. In other words, the phase difference film serving as the transparent film 41 has a characteristic that does not change the polarization state of the light passing through the liquid crystal display panel 2. As a result, a polarized direction of the light reaching the array-side polarizer 40 is orthogonal to the absorption axis 400 of the array-side polarizer 40. Therefore, the light inputted to the array-side polarizer 40 can be suppressed to be absorbed into the array-side polarizer 40, thereby improving the light usage efficiency.

As described above, in the liquid crystal display device 10 according to the preferred embodiment, the slow axis 410 of the phase difference film 41, the absorption axis 400 of the array-side polarizer 40, and the reflection axis 520 of the polarization reflection film 52 are parallel to one another, so that the light inputted to the array-side polarizer 40 can be suppressed to be absorbed into the array-side polarizer 40. Therefore, the light usage efficiency improves.

In the liquid crystal display device 10 according to the preferred embodiment, the polarized direction of the light reaching the array-side polarizer 40 is orthogonal to the absorption axis 400 of the array-side polarizer 40 also in a configuration in which only the slow axis 410 of the phase difference film 41 is rotated 90 degrees. As a result, the light usage efficiency improves. However, in this case, the slow axis 410 of the phase difference film 41 laminated on the array-side polarizer 40 and a slow axis 310 of a phase difference film 31 laminated on a color filter-side polarizer 30 are orthogonal to each other, so that a slight difference occurs in the thermal expansion behavior between a polarizing plate 3 and the polarizing plate 4.

Moreover, the light outputted from the backlight 5 without a polarization reflection film, such as the backlight 5 according to the first preferred embodiment as described above, includes slight polarized light components in various directions except non-polarized light components substantially used for display. Therefore, among the polarized light components, the polarized light components in a certain direction interfere with the phase difference film serving as the transparent film 41, whereby the light usage efficiency may be slightly reduced. However, the reduction in the light usage efficiency to this extent can be ignored. Thus, in either case where the backlight 5 does not have a polarization reflection film or the backlight 5 has a polarization reflection film, a phase difference film serving as the transparent film 41 is laminated on a main surface 40a on the side opposite to the liquid crystal display panel in the array-side polarizer 40, which can suppress occurrence of a warp of the liquid crystal display panel 2 and improve the light usage efficiency.

According to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
   a liquid crystal display panel having a first main surface and a second main surface opposite said first main surface;
   a first polarizing plate disposed on said first main surface;
   a second polarizing plate disposed on said second main surface; and
   a backlight, wherein
   said first polarizing plate includes:
      a first polarizer; and
      a first phase difference film, said first phase difference film being between said first polarizer and said first main surface of said liquid crystal display panel,
   said second polarizing plate includes:
      a second polarizer; and
      a second phase difference film, said second polarizer being between said second phase difference film and said second main surface of said liquid crystal display panel, and
   said backlight is positioned such that said second polarizing plate is between said liquid crystal display panel and said backlight.

2. The liquid crystal display device according to claim 1, wherein said second phase difference film has a characteristic that does not change a polarization state of a light passing through said liquid crystal display panel.

3. The liquid crystal display device according to claim 1, wherein said second phase difference film has the same thickness as the thickness of said first phase difference film.

4. The liquid crystal display device according to claim 1, wherein said second phase difference film is formed of the same material as that of said first phase difference film.

5. The liquid crystal display device according to claim 4, wherein said second phase difference film is the same type as said first phase difference film.

6. The liquid crystal display device according to claim 5, wherein a slow axis of said second phase difference film is parallel to a slow axis of said first phase difference film.

7. The liquid crystal display device according to claim 5, wherein
said backlight comprises a polarization reflection film,
an absorption axis of said second polarizer and a reflection axis of said polarization reflection film are parallel to each other, and
the absorption axis of said second polarizer and a slow axis of said second phase difference film are parallel or vertical to each other.

8. The liquid crystal display device according to claim 1, wherein said second polarizer is in contact with said second main surface of said liquid crystal display panel.

9. A liquid crystal display device, comprising:
a liquid crystal display panel having a first main surface and a second main surface opposite said first main surface;
a first polarizing plate disposed on said first main surface;
a second polarizing plate disposed on said second main surface; and
a backlight, wherein
said first polarizing plate includes:
a first polarizer; and
a first phase difference film, said first phase difference film being between said first polarizer and said first main surface of said liquid crystal display panel,
said second polarizing plate includes:
a second polarizer; and
a transparent film, said second polarizer being between said transparent film and said second main surface of said liquid crystal display panel,
the first polarizer and the second polarizer each have a layered structure in which protective layers are disposed on each side of a polarizing film,
said backlight is positioned such that said second polarizing plate is between said liquid crystal display panel and said backlight,
said transparent film is formed of the same material as that of said first phase difference film, and
said transparent film is a second phase difference film that is the same type as said first phase difference film.

10. The liquid crystal display device according to claim 9, wherein said transparent film has a characteristic that does not change a polarization state of a light passing through said liquid crystal display panel.

11. The liquid crystal display device according to claim 9, wherein said transparent film has the same thickness as the thickness of said first phase difference film.

12. The liquid crystal display device according to claim 9, wherein a slow axis of said second phase difference film is parallel to a slow axis of said first phase difference film.

13. The liquid crystal display device according to claim 9, wherein
said backlight includes a polarization reflection film,
an absorption axis of said second polarizer and a reflection axis of said polarization reflection film are parallel to each other, and
the absorption axis of said second polarizer and a slow axis of said second phase difference film are parallel or vertical to each other.

14. The liquid crystal display device according to claim 9, wherein said second polarizer is in contact with said second main surface of said liquid crystal display panel.

* * * * *